United States Patent [19]

Takahashi et al.

[11] Patent Number: 5,048,405
[45] Date of Patent: Sep. 17, 1991

[54] APPARATUS FOR MANUFACTURING FIBROUS FISH OR SHELLFISH "NERISEIHIN" PRODUCT

[75] Inventors: Toshikatsu Takahashi; Isamu Sasaki, both of Tokyo; Takeya Yoshioka, Fukuoka; Chuji Sarukawa, Tokyo, all of Japan

[73] Assignee: Nippon Suisan Kaisha, Ltd., Tokyo, Japan

[21] Appl. No.: 524,115

[22] Filed: May 16, 1990

[30] Foreign Application Priority Data

Jul. 10, 1989 [JP] Japan .................. 1-080971[U]

[51] Int. Cl.[5] .................. A22C 11/04; A23P 1/00
[52] U.S. Cl. .................. 99/470; 99/353; 99/483; 99/517; 366/77; 366/85
[58] Field of Search .................. 99/353–355, 99/357, 441, 467, 470, 483, 484, 516, 517; 366/77, 83–86, 301; 425/208, 207, 209, 577, 376 R; 426/512, 513

[56] References Cited

U.S. PATENT DOCUMENTS

| | | | |
|---|---|---|---|
| 3,685,804 | 8/1972 | Stansfield | 366/89 |
| 3,991,153 | 11/1976 | Klauner et al. | 366/90 |
| 4,200,041 | 4/1980 | Hildebolt et al. | 99/516 |
| 4,217,083 | 8/1980 | Machuque | 425/198 |
| 4,245,552 | 1/1981 | Small et al. | 99/483 |
| 4,302,111 | 11/1981 | Harris | 99/470 |
| 4,372,734 | 2/1983 | Dolan et al. | 426/512 |
| 4,542,686 | 9/1985 | Bansal | 99/517 |
| 4,721,448 | 1/1988 | Irish et al. | 425/209 |
| 4,740,379 | 4/1988 | Noguchi et al. | 99/441 |
| 4,816,278 | 3/1989 | Sasamoto et al. | 426/513 |

FOREIGN PATENT DOCUMENTS 0897208 1/1982 Japan .................. 366/85

Primary Examiner—Timothy F. Simone
Attorney, Agent, or Firm—Sughrue, Mion, Zinn, Macpeak & Seas

[57] ABSTRACT

An apparatus for manufacturing a fibrous fish or shellfish neriseihin product comprised mainly of a bundle of fibrous filaments, each of which includes protein or the like being linearly aligned and a thin surface layer covering over the bundle of the filaments. The apparatus includes a twin screw extruder including two screws rotated in the same direction for kneading, pressurizing and thermally fusing a fish and shellfish material as it is forcibly fed by the screws and for extruding the thermally fused material from an outlet of the extruder. The apparatus further includes a plurality of branch tubes having inlets respectively connected to the outlet of the extruder for tentatively collecting and retaining the thermally fused material for a moment, feed pumps having inlets respectively connected to the outlet of each of the branch tubes for feeding at a constant rate the material from the extruder and a cooling zone having inlets respectively connected to the outlet of each of the feed pumps for gradually cooling the material continuously fed from each of the feed pumps.

6 Claims, 7 Drawing Sheets

APPARATUS FOR MANUFACTURING FIBROUS FISH OR SHELLFISH "NERISEIHIN" PRODUCT

BACKGROUND OF THE INVENTION

Among "neriseihin" products prepared from fish or shellfish paste meat such as surimi or minced meat of fish and shellfish are known as Japanese food kamaboko, chikuwa and fish meat sausage. These "neriseihin" or fish or shellfish paste meat products are extensively marketed as food. To produce such "neriseihin", the edible part of fish and shellfish is kneaded with salt, seasoning, suitable additives and flavoring agents to produce paste meat, i.e., surimi and this paste meat is subjected to molding and heating and setting processes, in sequence, thus forming a fish or shellfish paste meat product or neriseihin having an elastic structure. A feature of the "neriseihin" is that the setting of the paste meat produces a three-dimensional net-work structure of protein or the like, thus providing a certain elasticity. Recently, a tendency toward the food taste is changing with westernization and Americanization and diversification of the living standards, and accordingly kamaboko, chikuwa, fish and shellfish sausage and other fish and shellfish "neriseihin" are improved to meet western and American requirements. However, these products are not essentially improved. More specifically, even in improved neriseihin products the net-work structure of protein remains as such and cannot always satisfy demands for westernization and Americanization and diversification of the diet. Further, for an enhancement of health it is demanded that the salt content be as low as possible or zero. Nevertheless, for producing surimi from the edible part of fish and shellfish it is necessary to add a comparatively large amount of salt so as to provide a certain degree of viscosity, by melting a protein contained in the edible part by addition of salt. This salt addition is undesired, however, from the health standpoint.

As an example, Japanese Patent Publication 64-27 and Japanese Patent Disclosure 62-259565 disclose using surimi of fish and shellfish as a raw material, subjecting it to cutting and kneading with salt or other additives and flavoring agent and seasoning agents to obtain surimi, producing strip-like moldings of the surimi, heating and setting the moldings to obtain a neriseihin product, i.e., kamaboko, then cutting the product lengthwise with a knife or the like to obtain many filaments and, then integrating these filaments by adding a binder of surimi to them and heating the integrated filaments using steam to produce neriseihin products resembling scallop meat or king crab leg meat. These food products are obtained by mechanically cutting "neriseihin" having usual kamaboko structure to form a fibrous structure like that of crab leg meat. Therefore, their appearance closely resembles natural scallop meat or king crab leg meat so that they can hardly be discriminated. However, although the individual filaments are thin and elongate, they retain a so-called kamaboko structure, i.e., a net-work structure, in which protein or the like is three-dimensionally coupled in a net like form. That is, their structure is essentially different from the structure of natural scallop meat or king crab meat. In addition, the conventional "neriseihin" product having a kamaboko structure contains a comparatively large amount of salt, which is undesired form the health standpoint.

Japanese Patent Disclosure 63-68059 and Japanese Patent Disclosure 63-68060 disclose methods of producing a fibrous neriseihin product consisting of a bundle of aligned fibrous elements, containing protein or the like linearly orientated, in order to closely resemble the structure of crab leg or shrimp with the structure of the neriseihin itself. These methods are developed by utilizing a conventional technique in that a twin screw extruder is used for a kneading step to prepare a bread paste raw material. In detail, fish or shellfish material such as surimi is mixed with additives and seasoning agents to obtain a sol material, which is then converted into a gel material by heating it or adjusting to high viscosity. The thus-obtained gel material having high viscosity is then kneaded and thermally fused in a twin-screw extruder. The fused material is then extruded via an outlet of the leading end of the extruder, thereby carrying out an aligned orientation of protein molecules or the like by making use of a shearing effect of the twin-screw extruder. Subsequently, each of the resultant aligned filaments is separated by using water. Then, the separated aligned filaments are mixed with fish and shellfish surimi containing salt, and the resultant mixture is molded into a desired shape and then set, followed by boiling or heating, resulting in a fibrous neriseihin product. The neriseihin which is obtained in this way, unlike the prior art kamaboko structure, has a structure, in which filaments having protein molecules aligned in a direction are randomly coupled together and integrated. This structure resembles the structure of natural crab or shrimp meat and fits the aim of westernization, Americanization, or diversification of living standards to a certain extent. These methods utilizes the conventional technique in that a twin-screw extruder is used in a kneading process to prepare bread paste raw material having high viscosity. In other words, each of these methods is merely a method in which, instead of bread paste raw material, fish and shellfish raw material is processed with a twin-screw extruder to carry out an orientation of filaments consisting of protein linearly aligned. However, owing to unsatisfactory orientation of filaments toward one direction, these oriented filaments are respectively separated and then randomly coupled together. For easily processing fish and shellfish material with a twin-screw extruder in this method, the sol material having low viscosity is pre-heated or adjusted to high viscosity by adding starch, salt, etc. in order to change its character to be close to the character of bread paste raw material. However, in spite of the fact that a product free from salt is desired, without addition of salt a viscosity like that of bread paste raw material cannot be obtained. Therefore, a desired product free from salt cannot be produced. In addition, a preparation of raw material having high viscosity owing to a twin screw extruder having a prior art structure cannot give a rise to satisfactory orientation of protein or the like, resulting in a product having imperfect protein orientation structure, which cannot be used as a desired marketable product. Accordingly, the unsatisfactory orientated product processed through a twin-screw extruder is disjointed by agitating it in water. The disjointed elements are then mixed with salt-containing surimi as binder, and the mixture is steamed or boiled to obtain a neriseihin as a marketable product. In such a method, a finishing process is required after the process in the twin-screw extruder, and therefore, the overall process of manufacture is complicated. In addition, in the finishing process, the product having a slightly imperfectly oriented structure is disjointed, and the disjointed elements are mixed with a binder before molding into a desired form. Therefore, it is impossible to obtain a product, in which filaments having a satisfactory orientation of protein molecules, are uniformly aligned in a certain direction.

In greater detail, a prior art extruder, which is used to prepare a bread paste raw material or like, comprises mainly a cylindrical barrel and a screw rotatable therein. The screw is provided on a screw shaft. A raw material mainly composed of flour is transported by the action of the screw, and during this time individual components of the material are kneaded together to obtain bread paste raw material. The raw material in the cylindrical barrel can be heated. The heating is usually effected by heating the cylindrical barrel itself with steam or an electric heater or by introducing steam into the material. The outlet end of the cylindrical barrel is throttled to form a nozzle or an orifice. With this throttled end, the material being transported by the screw is pressurized to increase its pressure. As an extruder, a uni-screw extruder with a single screw rotatably accommodated in a cylindrical barrel has been used, but recently there is a trend for using a twin-screw extruder, which has high material transportation capacity compared to the uni-screw extruder. The twin-screw extruder is capable of having a change of screws depending on the characteristics of the material and purpose of processing, and also it can process materials having high oil contents. For these reasons, it is used for preparing bread paste material.

Figure 1:
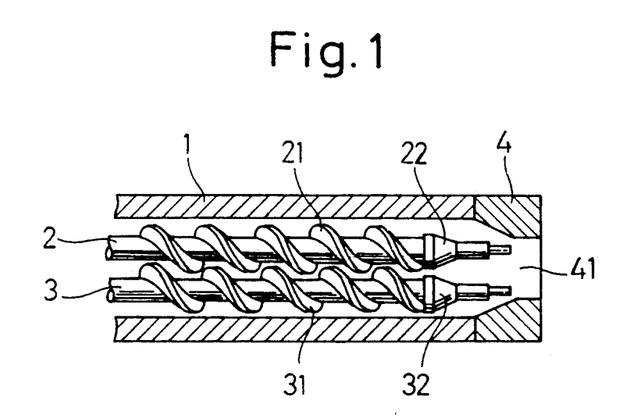
FIG. 1 is a sectional view showing part of a prior art twin-screw extruder.

FIG. 1 shows part of a typical example of the same direction rotation type twin-screw extruder. As it is shown, two screw shafts 2 and 3 are provided for rotation in the same directions in cylindrical barrel 1. Screws 21 and 31 on these screws shafts 2 and 3 are rotated in mesh with each other. Flock nuts 22 and 32 are provided at the ends of screw shafts 2 and 3, and barrel die 4 is provided in the vicinity of flock nuts 22 and 32. Barrel die 4 has a substantially central orifice or nozzle-like outlet 41. In cylindrical barrel 1, two screw shafts 2 and 3 are rotated in the same directions. With this rotation, material is kneaded and compressed while it is transferred by screws 21 and 31. During this time, material is heated by a heating element (not shown) in cylindrical barrel 1 and internal heat is generated at the time of applying shearing stress to the material by screws 21 and 23. Since the end of cylindrical barrel 1 is throttled with barrel die 4, material is pressurized as it is transferred. With a twin-screw extruder this pressure is increased to a pressure higher than the steam pressure. Therefore, neither effervescence nor splash takes place in cylindrical barrel 1. As material is extruded from outlet 41 of barrel die 4 into atmosphere, it is inflated to generate high pressure steam, so that the material is liable to be scattered and become fine particles. That is, a phenomenon of flashing is liable to occur to spoil the moldability of the product. Particularly, when the material has high viscosity and contains little moisture, this trend is promoted to spoil regular orientation, and a spructure having uniformly aligned filaments cannot be obtained.

To avoid this phenomenon, it is in practice to cool the material at outlet 41 of barrel die 4. However, even by cooling the material in this way the flashing cannot be perfectly avoided. Rather, when the material is cooled locally at outlet 41, clogging is caused to vary the pressure in cylindrical barred 1 and sometimes result in explosive discharge of material. Therefore, it is impossible to control the discharge and to obtain a molding having a desired shape.

U.S. Pat. No. 4,816,278 discloses a method, in which, for avoiding the flashing when processing the fish or shell fish raw material, a long tubular nozzle is coupled to the end of a cylindrical barrel such as to hold the material in a fused state in a first half of the nozzle while cooling the material to 100° C. or below in the second half of the nozzle, thus attaining a fibrous structure. However, while the flashing can be avoided with this long nozzle, the cooling zone is constituted by only one half of the length of the nozzle and is insufficient for providing an aligned orientation. Besides, the nozzle having the first heating or fusing zone and second cooling zone has a considerable overall length and offers high contact resistance. Therefore, material cannot be continuously and steadily supplied into the long tubular nozzle only with the sole extruding force of the twin-screw extruder.

SUMMARY OF THE INVENTION

According to the invention, there is provided an apparatus, which comprises a twin-screw extruder including two screws rotated in the same direction for kneading, pressurizing and thermally fusing fish and shellfish raw material being forcibly fed by the screws and extruding the resultant heated fused material from an outlet of the extruder, a plurality of branch tubes coupled to the outlet end of the extruder, feed pumps coupled to the outlet ends of the respective branch tubes for constantly feeding out the heated fused material from the extruder while it is in the heated and fused state, and cooling zones independently coupled to the outlets of the respective feed pumps, in which cooling zones the heated and fused material continuously supplied from the individual feed pumps is gradually cooled from the outer periphery of the material.

Thus, it is possible to feed fish and shellfish raw material constantly, at a constant rate and without interruption regardless of the moisture content and viscosity of the material or regardless of whether the material is in the state of a gel or a sol. Further, a fibrous neriseihin product having fibrous filaments consisting of linearly aligned protein or the like can be readily obtained by varying the cooling condition of the long cooling zones through control of the revolving rate of the feed pumps.

DETAILED DESCRIPTION OF THE PREFERRED EMBODIMENT

Referring now to FIGS. 2 to 5, reference numeral 5 designates a twin-screw extruder. This twin-screw extruder 5 has the same construction as the prior art twin-screw extruder shown in FIG. 1. As shown in FIG. 1, the extruder comprises a cylindrical barrel 1 and a pair of screw shafts 2 and 3. Screw shafts 2 and 3 are provided in cylindrical barrel 1, and screws 21 and 31 are provided on screw shafts 2 and 3. Screw shafts 2 and 3 are rotated in the same directions. With this rotation, fish and shellfish raw material supplied to cylindrical barrel 1 at the rear end thereof (not shown in FIG. 1) is transported to the outlet end of the barrel 1 without reverse flow. As it is transported, fish and shellfish material is kneaded and heated by a heating element (not shown) provided on the inner wall surface of cylindrical barrel 1. With this kneading and heating, the material is rendered to be a fused and heated material and loses its fish and shellfish structure. The material in this state is discharged from a substantially central outlet 41 of barrel die 4 provided at the outlet end of cylindrical barrel 1. Outlet 41 is nozzle or orifice-like in shape. Thus, fish and shellfish material transported by screws 21 and 31 is thermally fused under a pressurized condition, and heated fused material is extruded from outlet 41.

Figure 2:
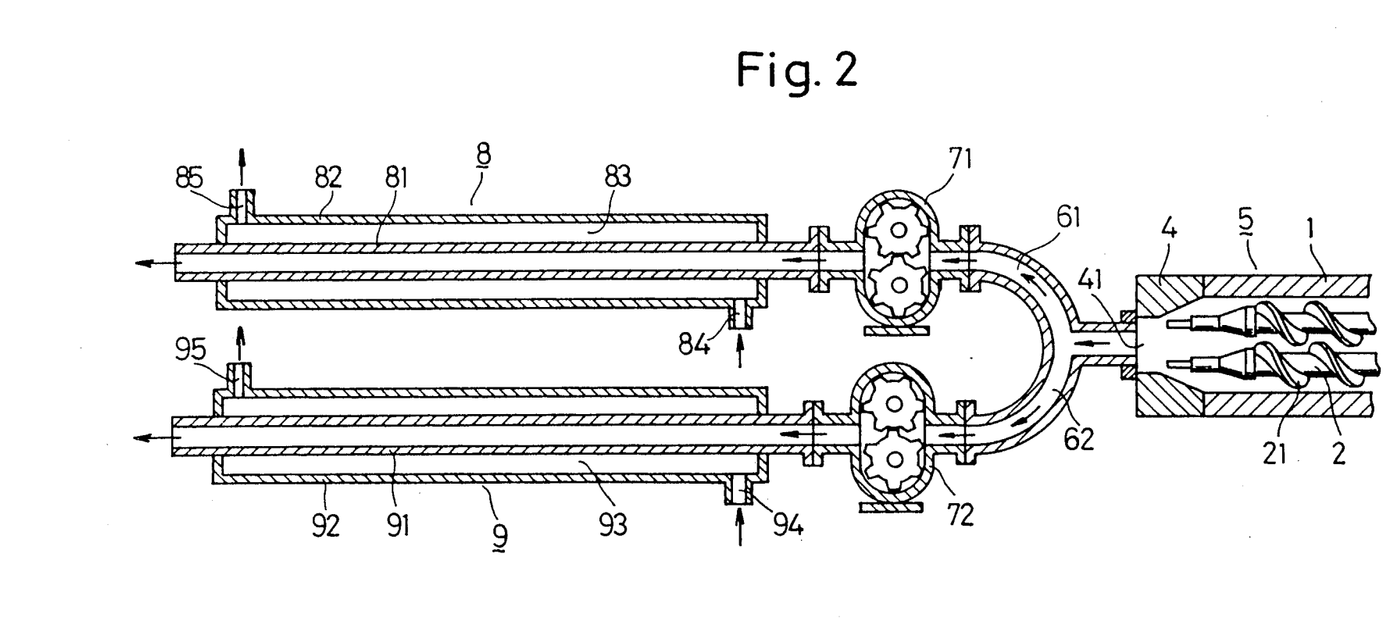
FIG. 2 is a sectional view showing an apparatus for manufacturing fibrous fish and shellfish neriseihin product as one embodiment of the invention.
Figure 3:
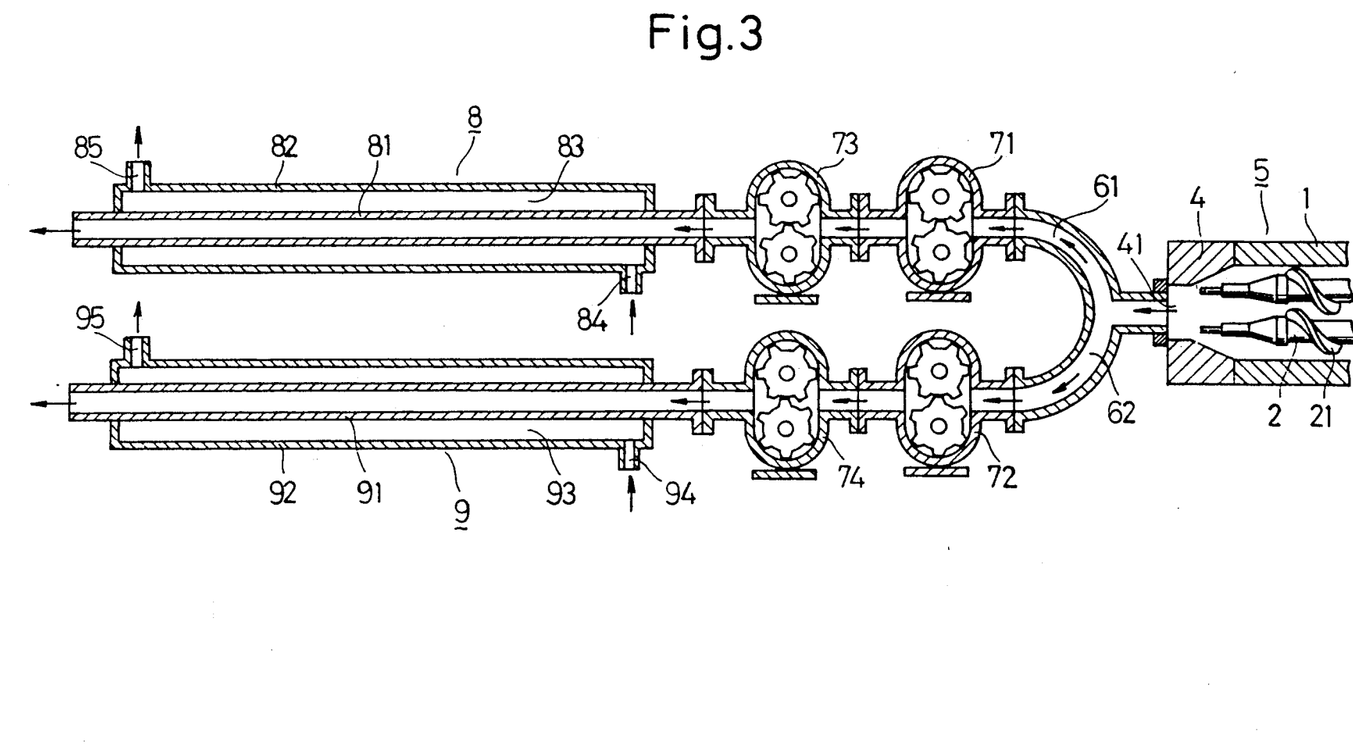
FIG. 3 is a sectional view showing an apparatus for manufacturing fibrous fish and shellfish neriseihin product as a different embodiment of the invention.

A plurality of branch tubes 61 and 62 are respectively coupled to the outlet end of the extruder 5, i.e., outlet 41. Branch tubes 61 and 62 are not desired to have too small length, but they have a sufficient length as shown in FIGS. 2 and 3, and at least one feed pump is coupled to the outlet end of each of these branch tubes 61 and 62. More specifically, in the case of FIG. 2 feed pumps 71 and 72 are coupled to respective branch tubes 61 and 62, while in the case of FIG. 3 two feed pumps 71 and 73 (72 and 74) are coupled to each of branch tubes 61 and 62. Feed pumps 71 to 74 are of a type normally capable of feeding heated fused material supplied through branch tubes 61 and 62 continuously and at a constant rate. As this type of pump, volume pumps, particularly gear pumps, are suitable. This is so because a volume pump is suited for extruding heated fused material constantly with a rotating rotor or gear. As such pump, commercially available gear pumps are very inexpensive and can attain a sufficiently constant feed.

With a plurality of branch tubes 61 and 62 coupled to the outlet end of the extruder 5, individual branch tubes 61 and 62 set to have a somewhat large length and feed pumps 71 to 74 such as volume pumps mounted at the outlet ends of branch tubes 61 and 62, troubles at outlet 41 of twin-screw extruder 5 can be precluded, and heated fused material can be very smoothly supplied to cooling zones 8 and 9 to be shown later in detail. In cooling zones 8 and 9, the heated fused material is cooled under a predetermined cooling condition through control of the revolving rate of the feed pumps, and fish and shellfish neriseihin having a fibrous structure consisting of aligned elements as shown in FIGS. 7 and 9 is obtained.

As has been mentioned, the kneading, heating, shearing and fusing of fish and shellfish raw material in the extruder are effected under a considerable pressure, and the pressure in the extruder is higher than the vaporizing pressure of water contained in the material so that inflation of fish and shellfish material or heated fused material never takes place in the extruder. However, when the material is discharged from outlet 41 to stmosphere as in the prior art atmosphere shown in FIG. 1, explosion of moisture content and inflation of heated fused material take place to result in generation of commonly termed crushed material to be extruded as small pieces or masses, that is, the heated fused material is extruded intermittently and not constantly. For this reason, as mentioned before it is in practice to cool barrel die 4, as shown in FIG. 1 or a nozzle, connected with the die 4, which holds the heated state of the material in the first half and cools the material in the second half of the nozzle, as disclosed in U.S. Pat. No. 4,816,278. With the former measure, only local cooling is provided, and clogging is instead produced at the outlet. With the latter measure, the nozzle has a large length and offers high contact resistances, and thereofore it is difficult to obtain constant extrusion of heated fused material with the sole extruding force of the extruder.

Figure 7:
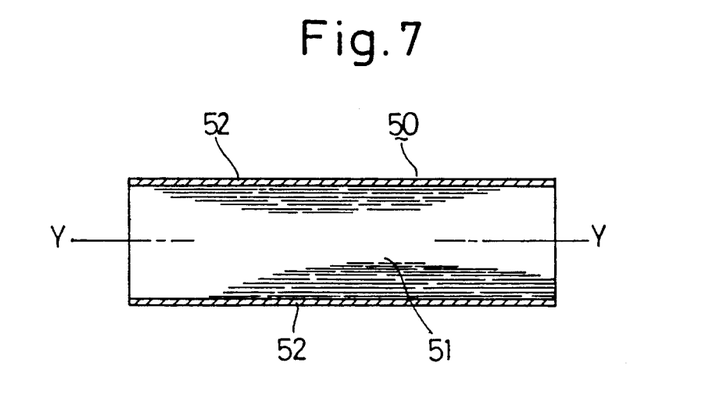
FIG. 7 is a sectional view taken along line A—A in FIG. 6.
Figure 9:
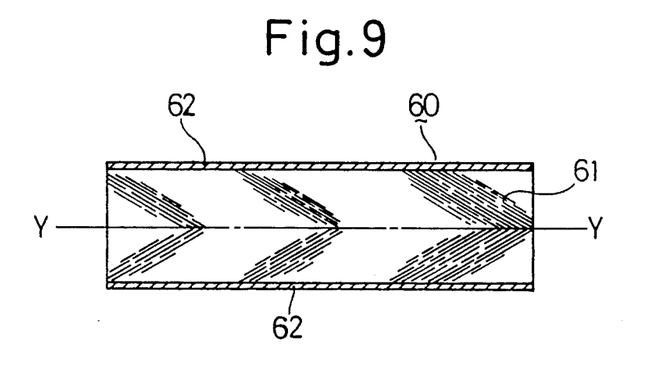
FIG. 9 is a sectional view showing a fibrous fish and shellfish neriseihin product according to a further embodiment of the invention.

These measures, therefore, are inadequate for gradually cooling heated fused material under adequate cooling conditions to obtain fibrous fish and shellfish neriseihin product having such structure as shown in FIGS. 7 and 9 as according to the invention.

According to the invention, cooling zones 8 and 9 are not directly connected to the outlet ends of branch tubes 61 and 62, but at least one feed pump, 71 to 74, is provided between each of branch tubes 61 and 62 and each of cooling zones 8 and 9, while constructing branch tubes 61 and 62 to have a large length. More specifically, cooling zones 8 and 9 are constructed to have a very large length, for instance 3 to 7 m. Therefore, even if heated fused material is extruded intermittently from the extruder 5 into branch tubes 61 and 62, the intermittence is eliminated while the heated fused material is retained in branch tubes 61 and 62, and the material is charged into branch tubes 61 and 62 without being cooled but in the heated and fused state uniformly and over the entire length. If the length of branch tubes 61 and 62 is insufficient, the intermittence of extrusion of material from the extruder 5 cannot be perfectly absorbed. With branch tubes 61 and 62 constructed to have a sufficient length, the extruding force of the extruder 5 does not have any influence on a transference of feeding heated fused material in cooling zones 8 and 9. Particularly, since cooling zones 8 and 9 are cooled over the entire length, the viscosity of heated fused material is greatly increased, and material cannot be constantly fed out due to the increase of the contact resistance of cooling zones 8 and 9. For this reason, according to the invention the heated fused material is not fed to cooling zones 8 and 9 by making use of the extruding force of twin-screw extruder 5, but it is fed to cooling zones 8 and 9 through branch tubes 61 and 62 with interposed feed pumps. With this arrangement, the material can be fed smoothly. The cooling rate in cooling zones 8 and 9 can be readily controlled by controlling the revolving rate of feed pumps 71 to 74.

Cooling zones 8 and 9 connected to branch tubes 61 and 62 have a length of 3 to 7 m, preferably 3.5 to 5.0 m and can cool material over the entire length. Cooling zones 8 and 9 are cylindrical and have a double-wall structure with cooling water passages 83 and 93 defined between inner tubes 81 and 91 and outer tubes 82 and 92. Cooling water is introduced in the direction of the arrow from inlets 84 and 94 of cooling zones 8 and 9 and drained from outlets 85 and 95. As cooling water passes through cooling water passages 83 and 93, heated fused material passing through inner tubes 81 and 91 is cooled from the outer periphery. As a result, fibrous filaments having aligned protein molecules are orientated toward a certain direction so as to obtain a fibrous structure as will be described later in detail.

Namely, when fish and shellfish raw material is heated and fused in the extruder, its structure is perfectly lost. When the heated fused material is cooled, the viscosity of the material is increased, and this increased viscosity material is prevented against inflation with the heated fused material serving as plug. In addition, protein or the like contained in the material is forcibly aligned by cooling, and this alignment is promoted in the direction of action of the shearing force generated with movement of the material and cooling thereof in the radial direction. Thus, in cooling zones 8 and 9, orientation toward one direction of the filament consisting of aligned protein as shown in FIGS. 7 and 9 can be obtained by controlling the revolving rate of pumps 71 to 74 and rate of supply and temperature of the cooling water. These conditions may be determined according to the afore-noted condition, but where cooling zones 8 and 9 have a length in a range of 3 to 7 m, it is suitable that heated fused material at 150° to 260° C. at the inlet is cooled gradually to provide a temperature gradient of 0.05° to 0.35° C./cm to 60° to 110° C. at the outlet.

Comparing FIGS. 2 and 3, in the case of FIG. 2, feed pumps 71 and 72 are each provided on each of the branch tubes 61 and 62, while in the case of FIG. 3 two feed pumps 71 and 73 (or 72 and 74) are provide on each branch tube. Feed pumps 71 to 74 serve to feed heated fused material to cooling zones 8 and 9. With the arrangement as shown in FIG. 3, the discharge of material into cooling zones 8 and 9 can be readily controlled to steadily promote the orientation of filaments and readily obtain a fibrous structure having filaments orientated toward a certain direction.

Products having various shapes can be obtained by varying the shape of the discharge portion of each cooling zones 8 and 9.

Figure 4:
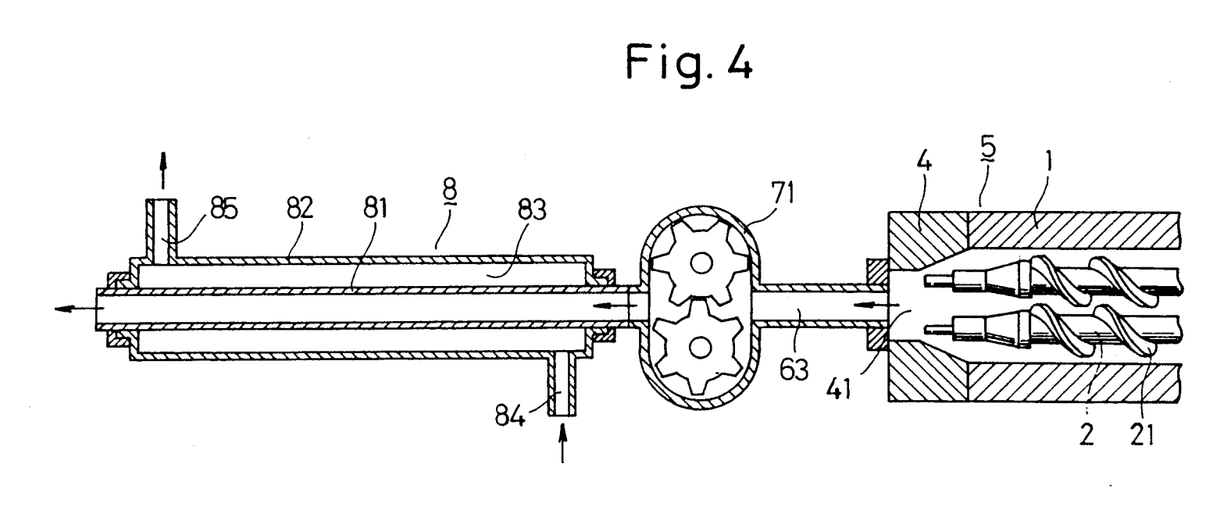
FIG. 4 is a sectional view showing an apparatus for manufacturing fibrous fish and shellfish neriseihin product as a further embodiment of the invention.
Figure 5:
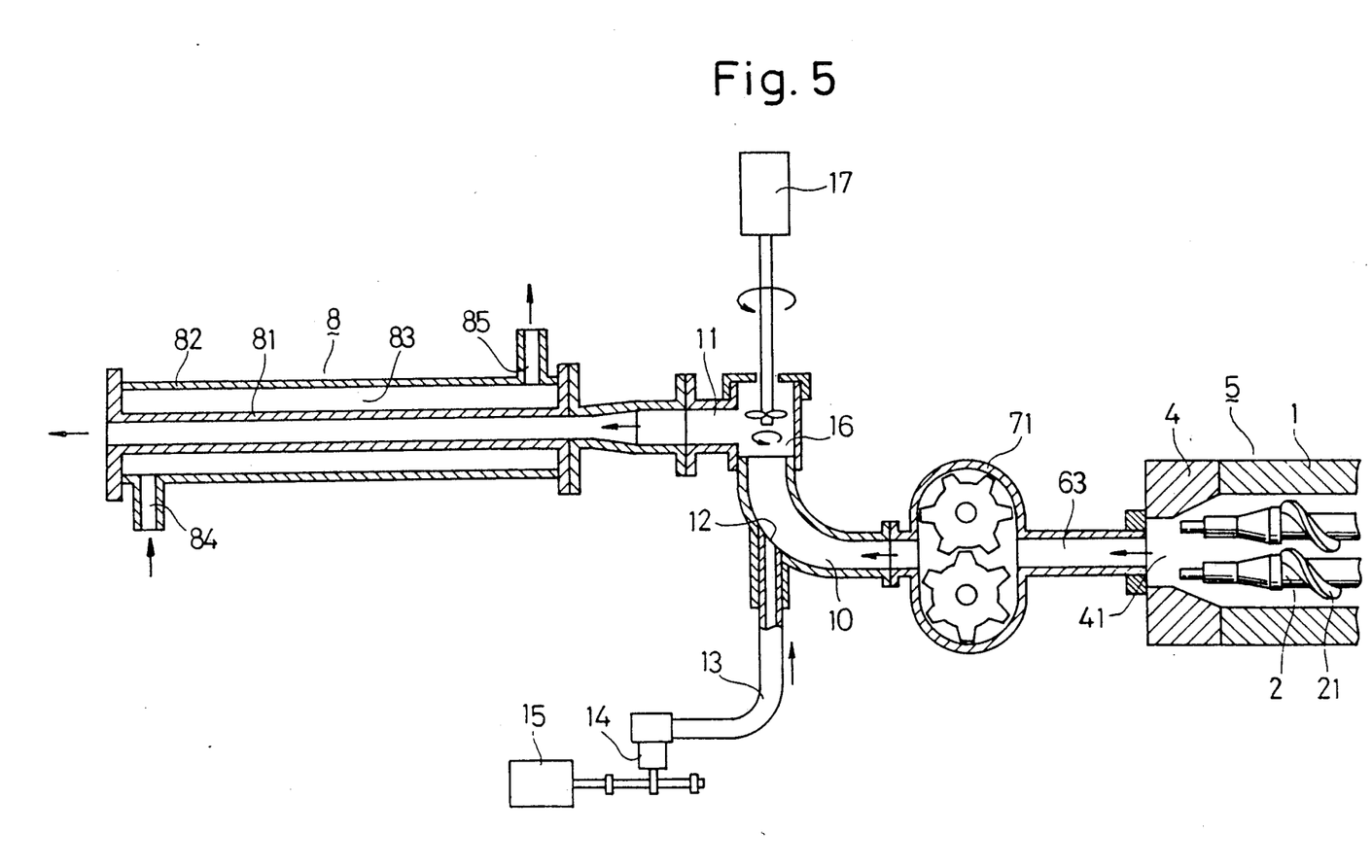
FIG. 5 is a sectional view showing an apparatus for manufacturing fibrous fish and shellfish neriseihin product as a still further embodiment of the invention.

In the example of FIG. 2 or 3, two feed pumps 71 and 72 or four feed pumps 71 to 74 are coupled to the outlet end of the extruder 5 via a plurality of branch tubes 61 and 62. However, as shown in FIGS. 4 and 5, a single coupling tube 63 may be coupled to the extruder 5, and one or more fed pumps 71 may be connected to the outlet end of coupling tube 63. With this arrangement of coupling tube 63, the same effects may be obtained by setting a comparatively large length of coupling tube 63. In the cases of FIGS. 4 and 5, however, the productivity is reduced compared to the cases of FIGS. 2 and 3 where branch tubes 61 and 62 are provided.

Among the examples in which the extruder 5 is coupled via a single coupling tube 63 to feed pump 71, the arrangement shown in FIG. 5 is one, in which a seasoning agent, flavoring agent or the like is added in a portion between feed pump 71 and cooling zone 8. In FIG. 5, first coupling tube 10 is coupled to the outlet end of feed pump 71, second coupling tube 11 is connected to the outlet end of first coupling tube 10, and cooling zone 8 is connected to the outlet end of second coupling tube 11. An inlet 12 of additive agents is provided on first coupling tube 10 at an intermediate position thereof, and the inlet 12 is connected to additive agent feeding means 14 via pipe 13, and feeding means 14 is driven by motor 15. Agitating unit 16 is provided between first and second coupling tubes 10 and 11 and is driven by motor 17. With the arrangement of FIG. 5, an additive agent is added from the inlet 12 to the heated fused material being fed by feed pump 71, and the resultant material is agitated in agitating unit 16 to be fed continuously to cooling zone 8.

Using the apparatus as shown above, it is possible to manufacture from fish and shellfish raw material a fibrous neriseihin, in which fibrous filaments containing aligned protein are orientated toward one direction, i.e., in parallel with the axis Y—Y, as shown in FIG. 7. It is also possible to manufacture a fibrous neriseihin, in which fibrous filaments are radially and obliquely orientated toward the axis Y—Y as shown in FIG. 9.

When manufacturing the former product with parallel fibrous filaments, the fish and shellfish material is used not in a state of sol but in a slightly gelated state obtained by preliminary heating before processing in the extruder. As for material, frozen or non-frozen surimi, minched meat or other edible part of fish and shellfish, meat such as chicken, pork, beef is used as a main material, among raw material, and livestock fat, starch, gluten, bean protein, gelatine, casein and so forth are added as desired. Where surimi or minced meat is used, salt may be added as in the prior art, or it may not or may be very lightly be added. In the latter case, salt-free surimi or minced meat is used as a raw material. The apparatus shown in FIGS. 2 to 5 can process salt-free surimi or minced meat without containing any added salt and having very low viscosity. The surimi or minced meat is conditioned as in the prior art regardless of whether salt is added or not. As an example, surimi is obtained by collecting the edible part of fish and shellfish, then exposing the meat of the edible part to water, then dehydrating the meat and then adding sugar, sorbit and phosphate to the meat for preventing deterioration thereof. Minced meat is obtained when meat, after exposing to water and dehydrating, is cut to masses with a diameter size of 1.0 cm or below through as a sieve of a conventional minced meat preparation machine. Surimi or minced meat may be stored in a frozen state. When processing the meat, it is thawed, then egg white, salt, starch, seasoning agent, flavoring agent, etc. are added as desired, and the resultant mixture is cut to obtain a sol using a silent cutter or the like. This sol is heated at 80° to 90° C. for 30 to 60 minutes, and then it is set by taking sufficient time, thus obtaining kamaboko, i.e., a fibrous neriseihin of fish and shellfish having a structure, in which protein is coupled in a three-dimensional net-work structure. This kamaboko is then cut with a chopper or a cutter into pieces with a diametric size of 1.0 to 3 mm, preferably around 2.5 mm.

These pieces of surimi or like, obtained after heating, are supplied as raw material of fish and shellfish to the extruder 5 shown in FIGS. 2 to 5 for kneading, heating and fusing in the twin-screw extruder.

As suitable conditions for processing in the twin-screw extruder 5, the rate of feed of raw material is 60 kg/h, screw shaft revolving rate is 170 to 200 rpm, pressure is 5 to 20 kg/cm, and cylindrical barrel temperature is 150° to 260° C., preferably 170° to 190° C. Suitably, a temperature gradient is provided in the extruder from the inlet to the outlet thereof.

The heated fused material obtained in this way is fed through the branch tubes and coupling tubes without being cooled in the barrel die. The branch tubes and coupling tubes are comparatively long as noted above. Therefore, when a raw material having high viscosity is discharged intermittently from the outlet of the barrel die, the intermittence is lost, as the material is retained in the branch tubes and coupling tubes, and the material is fed at a constant rate to feed pumps 71 to 74. In this way, the heated fused material is fed to cooling zones 8 and 9 at a rate determined by the revolving rate of the feed pumps. The heated fused material is gradually cooled down only after it enters cooling zones 8 and 9 having a length of 3 to 7 m, for instance. The material is cooled so as to provide a temperature gradient of 0.05° to 0.35° C./cm and down to 60° to 110° C., and a rod-like product shown in FIG. 6 is obtained as a final neriseihin product 50 of fish and shellfish.

Figure 6:
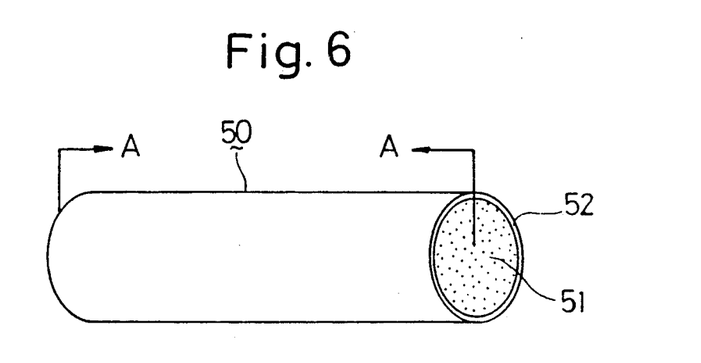
FIG. 6 is a perspective view showing an example of fish and shellfish neriseihin product manufactured by the method according to the invention.

Neriseihin product 50 shown in FIG. 6 is rod-like and has a circular sectional profile and is comprised mainly of fibrous filaments 51 and surface layer 52 covering over filaments 51. Its surface layer 52 has a smooth tactile impression, and in its structure as shown in FIG. 7 innumerable filaments 51 with diameters ranging from the order of microns to the order of millimeters, usually less than 1.0 mm, are coupled together. Individual filaments 51 are orientated toward one direction, i.e., in parallel with the axis or in a radial and oblique direction toward the axis.

Figure 8:
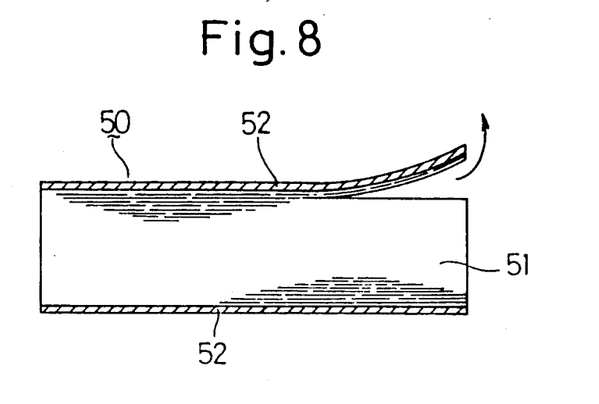
FIG. 8 is a view showing the fibrous fish and shellfish neriseihin product shown in FIG. 7 with a filament torn in one direction.

Thus, holding some filaments 51 when eating the product, the product is torn apart as shown in FIG. 8. The product thus can be freely torn apart in the lengthwise direction at a desired position when eating it. Neriseihin 50 need not have a circular sectional profile, but may be oval or angular, such as triangular, tetrangular, polygonal, or hollow as well. In this neriseihin 50, protein or the like contained in individual filaments 51 are linearly aligned at the time of extrusion of the extruder 5, and in cooling zones 8 and 9 individual filaments 51 are orientated toward one direction and coupled together to such an extent that they are not decoupled even when it is charged into and agitated in water. More specifically, since fish and shellfish material mainly consists of pieces preliminarily set by heating, and the heated fused material obtained after kneading and heating in the extruder has retained character of the pieces and has high viscosity. Thus, its components, i.e., filaments, tend to be aligned with respect to the direction of movement of material and not substantially with respect to other directions while the material is gradually cooled in the cooling zones while holding the above tendency, individual filaments are continuous as long filaments in the length direction, and in this state they are coupled together when they are solidified.

When manufacturing a fibrous neriseihin, in which fibrous filaments consisting of protein and like components coupled together are orientated radially, particularly radially obliquely, toward the axis, raw material of fish and shellfish is processed in the apparatus as shown in FIGS. 2 to 5 while it is in the state of sol. The heating condition in the extruder and cooling condition in the cooling zones are varied to provide for slightly lower pressure, whereby the product can be readily manufactured.

As raw material of fish and shellfish, like the above case, surimi or minced meat is used as the main material, and also like the above, livestock fat, paste meat, starch, gluten, bean protein and other coupling agents are used as auxiliary material, as well as seasoning agent, coloring agent and other ordinary additives. In this case, salt-free surimi or minced meat may be prepared without adding any salt. While surimi or minced meat may be prepared as in the prior art as noted before, it is directly used as raw material of fish and shellfish in the state of sol containing with a water content of 70 weight parts or above for processing in the apparatus as shown in FIGS. 2 to 5. By so doing, neriseihin 60 of fish and shellfish having a structure as shown in FIG. 9 can be obtained. The product has radially obliquely orientated filaments 91, and its structure resembles crab leg meat.

Generally, if material has high water content and low viscosity when it is processed using an extruder, the extrusion moldability is spoiled, and required energy for molding is extremely increased due to high water content. For this reason, the material in the state of sol is desirably gelated in advance by heating to reduce the water content and viscosity before processing. According to the invention, however, cooling zones 8 and 9 capable of cooling over the entire length are provided via feed pumps 71 to 74 as shown in FIGS. 2 to 5, and thus the material can be processed while it is in the state of sol to obtain a neriseihin having a structure as shown in FIG. 9. More specifically, with a high water content high viscosity material, sufficient fluidity of protein and other compounds can be obtained, and filaments formed as a result of cooling and solidification from the outer periphery are subjected to a shearing action and radially orientated to form the structure. If the water content is less than 70 weight parts, the fluidity is spoiled, and filaments formed by cooling are not orientated radially. In the case of salt-containing surimi and minced meat, even with the appearance of salt-soluble protein the viscosity remains low because of high water content. With salt-free surimi or minced meat, substantially no salt-soluble protein appears, and the viscosity is low, thus permitting satisfactory fluidity of protein or the like to be ensured.

When using raw material of fish and shellfish in the state of sol, by setting a slightly higher temperature heating condition of the extruder, particularly 10° to 20° C. higher than the condition for obtaining the structure shown in FIG. 9 and correspondingly controlling the cooling condition of the cooling zones, a neriseihin having a structure as shown in FIG. 7 can be obtained.

In either case, the product obtained from the cooling zones need not have a circular sectional profile but may have any other suitable shape as well.

We claim:

1. An apparatus for manufacturing a fibrous neriseihin of fish and shellfish comprising:
    a twin screw extruder including two screws rotated in the same direction for kneading, pressurizing and thermally fusing a raw material, consisting mainly of a fish and shellfish material as the raw material is forcibly fed by said screws and for extruding the thermally fused material from an outlet of said extruder;
    a plurality of branch tubes having inlets respectively connected to the outlet of said extruder for tentatively collecting and retaining said thermally fused material for a moment;
    feed pumps having inlets respectively connected to the outlet of each said branch tube for feeding at a constant rate the material from said extruder while holding the material in the thermally fused state; and cooling zones having inlets respectively connected to the outlet of each said feed pump for gradually cooling the material continuously fed from each said feed pump in the thermally fused state from an outer periphery of the material.

2. The apparatus according to claim 1, wherein said branch tubes are constituted by a single long coupling tube connecting the outlet of said extruder and the inlet of said cooling zones.

3. The apparatus according to claim 1, wherein said feed pumps consist of volume type gear pumps.

4. The apparatus according to claim 1, wherein a plurality of feed pumps are provided between said branch tubes and said cooling zones.

5. The apparatus according to claim 1, wherein each said cooling zone is cylindrical in shape and has an outer annular cooling water passage.

6. The apparatus according to claim 1, wherein each said cooling zone has a length of 3 to 7 m.

* * * * *